US012084918B2

(12) United States Patent
Mora et al.

(10) Patent No.: US 12,084,918 B2
(45) **Date of Patent: *Sep. 10, 2024**

(54) TRI-FOOT, LADDER AND METHOD

(71) Applicant: Werner Co., Greenville, PA (US)

(72) Inventors: Daniel C. Mora, Transfer, PA (US); Robert D. Beggs, Stoneboro, PA (US)

(73) Assignee: Werner Co., Greenville, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/191,121

(22) Filed: Nov. 14, 2018

(65) Prior Publication Data

US 2019/0078386 A1 Mar. 14, 2019

Related U.S. Application Data

(63) Continuation of application No. 15/392,020, filed on Dec. 28, 2016, now Pat. No. 10,138,682.

(51) Int. Cl.

| | |
|---|---|
| ***E06C 7/42*** | (2006.01) |
| ***E06C 7/44*** | (2006.01) |
| ***E06C 7/46*** | (2006.01) |
| *E04G 5/02* | (2006.01) |

(52) U.S. Cl.

CPC .................. *E06C 7/42* (2013.01); *E06C 7/44* (2013.01); *E06C 7/46* (2013.01); *E04G 5/02* (2013.01)

(58) Field of Classification Search

CPC ..... E06C 7/42; E06C 7/44; E06C 7/46; E04G 5/02; A47B 13/021; A47B 91/00

USPC ................... 248/188, 188.8, 188.9, 525, 677

See application file for complete search history.

(56) References Cited

U.S. PATENT DOCUMENTS 1,243,844 A * 10/1917 Lofstrom .................. E06C 7/46 182/109
1,293,066 A * 2/1919 Faulkner ................... E06C 7/46 182/111
1,352,323 A 9/1920 Johan
1,382,833 A 6/1921 Hurd
1,431,068 A 10/1922 Waney (Continued)

FOREIGN PATENT DOCUMENTS

GB 2360548 * 10/1995

OTHER PUBLICATIONS

1996 Werner Catalog—Available on or before Dec. 31, 1996, 2 pages.

(Continued)

*Primary Examiner* — Daniel P Cahn
*Assistant Examiner* — Shiref M Mekhaeil
(74) *Attorney, Agent, or Firm* — Fitch, Even, Tabin & Flannery LLP

(57) ABSTRACT

A ladder having a first rail having a bottom. The ladder having a second rail. The ladder having rungs attached to the first rail and second rail upon which a user climbs the ladder. The ladder comprises a ladder foot rotatably attached adjacent to the bottom of the first rail. The ladder foot having three distinct and different surfaces, with the first rail resting on one of the three surfaces at any one time the first rail is up right. The first rail changing to any of the three surfaces for the first rail to be upright upon by rotating the ladder foot. A method for placing a ladder. A ladder foot rotatably attached adjacent to a bottom of a first rail of a ladder. A method for making a ladder.

18 Claims, 1 Drawing Sheet

(56) References Cited

U.S. PATENT DOCUMENTS 1,436,804 A 11/1922 Hubbard
1,459,350 A 6/1923 Veniero
1,496,201 A 6/1924 Baxter
1,543,723 A 6/1925 Rivitz
1,570,576 A * 1/1926 Rivitz ........ E06C 7/46 403/117
1,879,017 A 9/1932 Babitt
1,973,226 A * 9/1934 Rose ........ E06C 7/46 248/188.9
2,163,970 A 6/1939 White
2,277,939 A * 3/1942 Thalhammer ........ F16M 11/247 248/351
2,309,484 A * 1/1943 Van Meter ........ E06C 7/46 182/109
2,407,575 A * 9/1946 Ramsey ........ E06C 7/46 182/110
2,503,626 A * 4/1950 Mayberry ........ E06C 7/44 182/201
2,567,989 A 9/1951 Cheek
2,605,037 A 7/1952 Smith
2,623,679 A * 12/1952 Agombar ........ E06C 7/46 182/109
2,691,479 A * 10/1954 Sharp ........ E06C 7/46 182/109
2,767,898 A * 10/1956 Cramer ........ E06C 7/46 182/109
3,005,513 A 10/1961 Larson
3,099,103 A 7/1963 Wright
3,805,917 A * 4/1974 Luther ........ E06C 7/44 182/200
3,913,942 A * 10/1975 MacKenzie ........ E02F 9/085 280/764.1
3,948,352 A 4/1976 Larson
4,023,828 A * 5/1977 Mackenzie ........ E02F 9/085 280/763.1
4,304,318 A 12/1981 Webb
4,415,062 A * 11/1983 Shaw ........ E06C 7/46 182/109
4,474,387 A * 10/1984 Maranell ........ B62H 1/00 254/DIG. 1
4,546,996 A * 10/1985 Hanson ........ E02F 3/964 280/764.1
4,699,247 A 10/1987 Clarke
4,748,734 A 6/1988 Schmitt
5,054,812 A * 10/1991 Lagsdin ........ E02F 9/085 280/764.1
5,141,076 A 8/1992 Joyce
5,154,255 A * 10/1992 Kiska ........ E06C 7/46 182/111
5,370,203 A * 12/1994 Kiska ........ E06C 7/42 182/109
D359,366 S * 6/1995 Spevak ........ D25/68
5,427,342 A 6/1995 Gagnon
5,522,473 A 6/1996 Moselsky
5,547,220 A * 8/1996 Lagsdin ........ E02F 9/085 280/764.1
5,636,706 A 6/1997 Plotner
5,645,272 A 7/1997 Brennan, Sr.
5,791,435 A 8/1998 Garnett
5,791,439 A 8/1998 Plotner
5,908,085 A 6/1999 Lovelady
5,918,698 A 7/1999 Lunn
5,957,496 A * 9/1999 Lagsdin ........ E02F 9/085 280/763.1
6,012,546 A 1/2000 Bee
6,044,929 A * 4/2000 Wishner ........ E06C 7/426 182/200
6,227,570 B1 * 5/2001 Martinez ........ B60S 9/10 280/764.1
6,422,603 B2 * 7/2002 Lagsdin ........ E02F 9/085 280/764.1
6,499,563 B1 12/2002 Bremick
6,634,672 B1 * 10/2003 Lagsdin ........ E02F 9/085 248/188.8
7,000,731 B2 2/2006 Swiderski
7,207,534 B2 * 4/2007 Crain ........ F16M 13/02 248/188
D555,258 S 11/2007 Wirch
7,803,031 B1 9/2010 Winckler
7,837,010 B2 11/2010 Astor
8,407,855 B2 4/2013 Gagnon
8,807,277 B1 * 8/2014 Reyna Lerma ........ E06C 7/42 182/108
9,145,687 B1 9/2015 Bancroft
10,206,511 B2 * 2/2019 Peters ........ A47B 91/12
10,612,302 B2 * 4/2020 Maxfield ........ E06C 7/423
11,346,154 B2 * 5/2022 Major ........ E06C 7/46
2004/0020715 A1 2/2004 Swiderski
2004/0178617 A1 * 9/2004 Lagsdin ........ B60S 9/12 280/763.1
2005/0011702 A1 1/2005 Zeaman
2006/0054391 A1 * 3/2006 Tilley ........ E04D 15/00 182/107
2006/0231334 A1 10/2006 Hall
2007/0227819 A1 * 10/2007 Layfield ........ E06C 1/34 182/206
2007/0246301 A1 10/2007 Shaffer
2011/0017549 A1 * 1/2011 Lietz ........ E06C 1/06 182/172
2011/0139544 A1 * 6/2011 Frick ........ E04F 11/002 182/27
2012/0175188 A1 7/2012 Xu
2012/0261214 A1 10/2012 Dondurur
2014/0001333 A1 1/2014 Stephen
2014/0332316 A1 11/2014 Tiber
2014/0353084 A1 12/2014 Lafontaine
2017/0370520 A1 * 12/2017 Knickrehm ........ B66D 3/26
2018/0094403 A1 4/2018 Nobles
2018/0230746 A1 * 8/2018 Maxfield ........ E06C 7/423
2020/0232278 A1 * 7/2020 Maxfield ........ E06C 7/46
2020/0240210 A1 * 7/2020 Maxfield ........ E06C 7/46

OTHER PUBLICATIONS

1999 Louisville Ladder Catalog—Available on or before May 18, 1999, 11 pages.
1999 Louisville Ladder Rhino 375 Press Release—Available on or before Aug. 29, 1999, 1 page.
2000 Werner T7200 Brochure—Available on or before Apr. 30, 2000, 1 page.
2001 Louisville Ladder Catalog—Available on or before Jun. 30, 2001, 5 pages.
2001 Louisville Ladder Website Catalog—Available on or before Jan. 17, 2001, 1 page.
Collection of web pages for various Louisville Ladders—Available on or before Jan. 21, 2020, 33 pages.
Copyright registration of Modern Plastics Handbook, Mar. 13, 2000, 1 page.
Declaration of Jon B. Ver Halen submitted in IPR 2019-00336—Available on or before Mar. 22, 2019, 112 pages.
Declaration of Mack A. Quan submitted in IPR 2019-00336—Available on or before Nov. 22, 2019, 40 pages.
Declaration of Thomas J. Schmitt submitted in IPR 2019-00336—Available on or before Nov. 22, 2019, 41 pages.
Excerpts from McGraw-Hill Dictionary of Scientific and Technical Terms, Sixth Edition, McGraw-Hill Available on or before Dec. 31, 2003, 5 pages.
FM1100HD Series ladder website—available on or before Aug. 28, 1999, 1 page.
FP1100HD Series step ladder website—Available on or before Aug. 28, 1999, 1 page.
FS1000 Series Ladder website—Available on or before Jan. 17, 2001, 1 page.
Huntsman Website Excerpts—Available on or before Jul. 10, 2001, submitted in IPR 2019-00336 with Affidavit of Christopher Butler, 6 pages.

(56) References Cited

OTHER PUBLICATIONS

IPR Petition submitted in IPR 2019-00336—U.S. Pat. No. 7,000,731—on Mar. 22, 2019, 73 pages.
Louisville Ladder Accessories website—Available on or before Feb. 17, 2001, 1 page.
Harper, Charles A., Modern Plastics Handbook—Available on or before Mar. 13, 2000, 268 pages.
Patent Owner Demonstrative Exhibits submitted in IPR 2019-00336—Available on or before May 28, 2020, 48 pages.
Petitioners Demonstrative Exhibits submitted in IPR 2019-00336—Available on or before May 28, 2020, 104 pages.
Rhino 375 Fiberglass Mechanic Step Ladder website—Available on or before Jan. 17, 2001, 1 page.
Rhino 375 Website registration—Available on or before Apr. 19, 2001, 1 page.
Web page for Louisville Ladder Series FM1500 3-Foot Fiberglass Ladder—Available on or before Jan. 21, 2020, 3 pages.
Web page for Louisville Ladder Series FS1500 3-Foot Fiberglass Ladder—Available on or before Jan. 21, 2020, 4 pages.

* cited by examiner

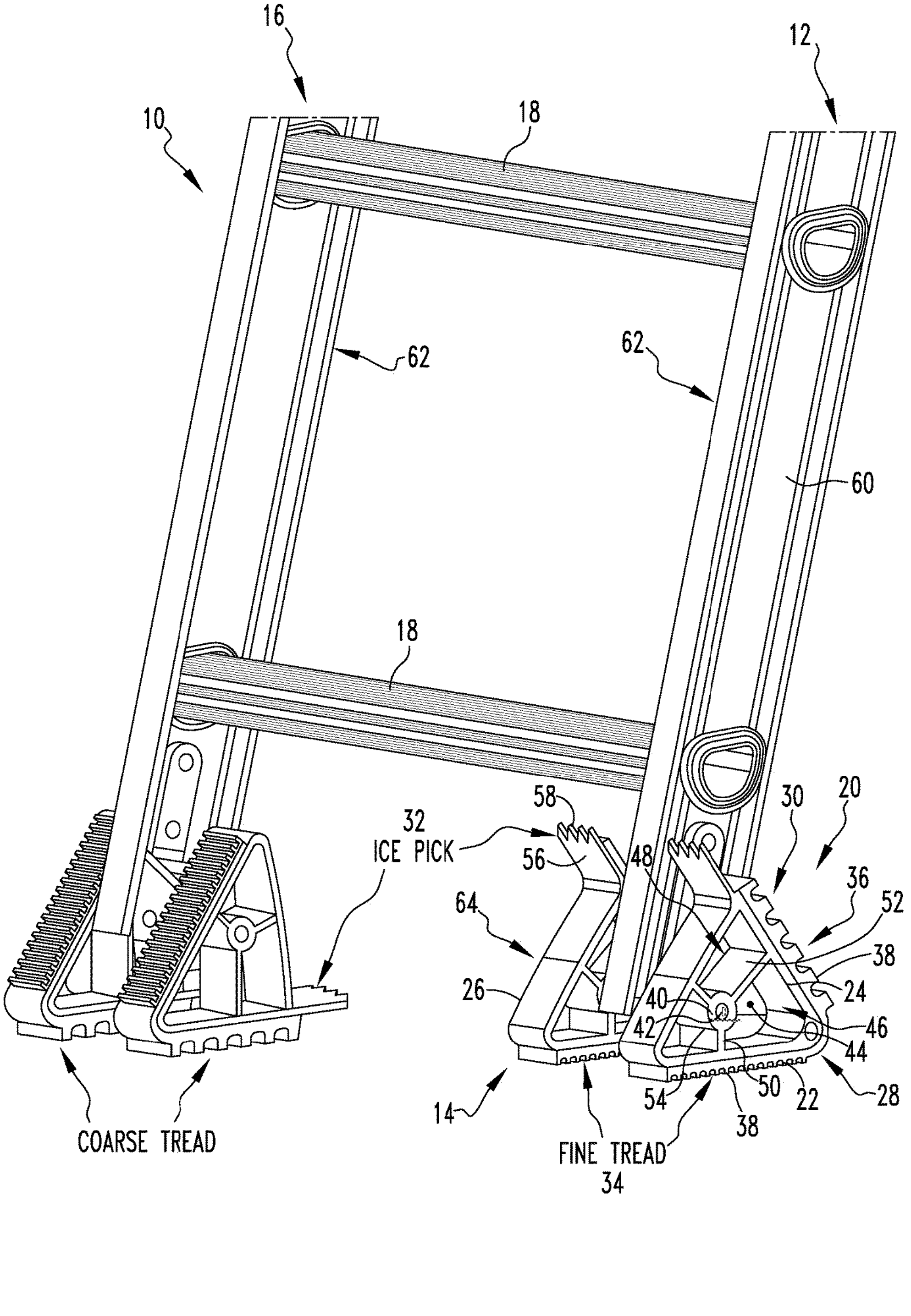
16
12
10
18
62
62
60
18
58
32
ICE PICK
56
48
30
20
36
52
64
38
26
24
40
42
46
44
54
50
22
28
14
38
COARSE TREAD
FINE TREAD
34

TRI-FOOT, LADDER AND METHOD

CROSS-REFERENCE TO RELATED APPLICATIONS

This application is a continuation of U.S. patent application Ser. No. 15/392,020, filed Dec. 28, 2016, now U.S. Pat. No. 10,138,682, incorporated by reference herein.

FIELD

The present invention is related to a ladder foot having three distinct and different surfaces that can be rotated into position quickly, depending on the type of ground on which the ladder will be set upon. (As used herein, references to the "present invention" or "invention" relate to exemplary embodiments and not necessarily to every embodiment encompassed by the appended claims.) More specifically, the present invention is related to a ladder foot having three distinct and different surfaces that can be rotated into position quickly, depending on the type of ground on which the ladder will be set upon where the foot has a triangular-shape with a fine tread for use on floors indoors, a course tread for use on ground outside, and a pick for insertion into the ground.

BACKGROUND

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

When using a ladder, it is always desirable to have as secure a placement on a floor or ground as possible. A ladder foot at the bottom of each rail of a ladder is commonly used to provide a more secure interface between the ladder and the floor or ground than the ladder rail itself can typically offer. The more surfaces that a ladder foot offers for the user to choose from to place the ladder upon, the more closely the surface can match the ground upon which the ladder will be placed. A ladder foot usually has only one or two surfaces available at a time to quickly position while attached to the ladder.

BRIEF SUMMARY OF THE INVENTION

The present invention pertains to a ladder. The ladder comprises a first rail having a bottom. The ladder comprises a second rail. The ladder comprises rungs attached to the first rail and second rail upon which a user climbs the ladder. The ladder comprises a ladder foot rotatably attached adjacent to the bottom of the first rail. The ladder foot having three distinct and different surfaces, with the first rail resting on one of the three surfaces at any one time the first rail is up right. The first rail changing to any of the three surfaces for the first rail to be upright upon by rotating the ladder foot.

The present invention pertains to a method for placing a ladder. The method comprises the steps of moving the ladder to a desired location. The ladder having a first rail and a second rail and rungs attached to the first rail and second rail upon which a user climbs the ladder. There is the step of rotating a ladder foot attached adjacent to a bottom of the first rail until one of three distinct and different surfaces of the ladder foot is facing ground. There is the step of setting the ladder onto the ground with the one of three distinct and different surfaces of the ladder foot resting on the ground when the ladder is upright.

The present invention pertains to a ladder foot rotatably attached adjacent to a bottom of a first rail of a ladder. The ladder foot comprises three distinct and different surfaces, with the first rail resting on one of the three surfaces at any one time the first rail is upright. The first rail changing to any of the three surfaces for the first rail to be upright upon by rotating the ladder foot. The ladder foot comprises a bolthole through which a bolt extends to rotatably attach the ladder foot to the first rail.

The present invention pertains to a method for making a ladder. The method comprises the steps of placing a bolt through a bolthole of a ladder foot having three distinct and different surfaces, with a first rail of the ladder resting on one of the three surfaces at any one time the first rail is upright. The first rail changing to any of the three surfaces for the first rail to be upright upon by rotating the ladder foot. There is the step of attaching the ladder foot to the first rail with the bolt.

BRIEF DESCRIPTION OF THE SEVERAL VIEWS OF THE DRAWING

In the accompanying drawings, the preferred embodiment of the invention and preferred methods of practicing the invention are illustrated in which:

FIG. 1 shows a ladder with a foot of the present invention.

DETAILED DESCRIPTION OF THE INVENTION

Referring now to the drawings wherein like reference numerals refer to similar or identical parts throughout the several views, and more specifically to FIG. 1 thereof, there is shown a ladder 10. The ladder 10 comprises a first rail 12 having a bottom 14. The ladder 10 comprises a second rail 16. The ladder 10 comprises rungs 18 attached to the first rail 12 and second rail 16 upon which a user climbs the ladder 10. The ladder 10 comprises a ladder foot 20 rotatably attached adjacent to the bottom 14 of the first rail 12. The ladder foot 20 having three distinct and different surfaces, with the first rail 12 resting on one of the three surfaces at any one time the first rail 12 is upright. The first rail 12 changing to any of the three surfaces for the first rail 12 to be upright upon by rotating the ladder foot 20.

The ladder foot 20 may essentially have the shape of a triangle with a first face 22, second face 24 directly connected to the first face 22, and a third face 26 directly connected to the first face 22 and second face 24. The first face 22 may have a first surface 28, the second face 24 has a second surface 30 different from the first surface 28, and the third face 26 has a pick 32 extending essentially perpendicular from it. The first surface 28 may be a fine rubber tread 34, and the second surface 30 may be a course rubber tread 36, where the course rubber tread 36 has larger and fewer grooves 38 per inch than the fine rubber tread 34 which has smaller and more grooves 38 than the course rubber tread 36.

The ladder foot 20 may have a bolthole 40 through which a bolt 42 extends to attach the ladder foot 20 to the first rail 12. The ladder foot 20 able to pivot about the bolt 42 so either the first, second or third surface can be chosen for the first rail 12 to rest upon. The triangular shape of the foot 20 may have a geometric center 44 and the bolthole 40 with the bolt 42 passing through the bolthole 40 offset from the geometric center 44. The bolthole 40 may be located in the triangular shape of the foot 20 closer to the face with the fine rubber tread 34 than the face with the course rubber tread 36 so the ladder foot 20 is taller relative to ground when the course rubber tread 36 is resting on the ground and enables a user to level the ladder 10 when the ladder 10 is set up on uneven ground by using the course tread on a face of the uneven ground which is lower than the fine tread on a face of the uneven ground on a second ladder foot 64 on the second rail 16 which is higher.

Each surface may be rectangular shaped, each face may be essentially flat, and the third surface may be essentially flat. The triangular shaped foot 20 may have an interior 46 with buttressing 48 that holds the bolthole 40. The buttressing 48 may include a first plate 50 extending into the interior 46 from the first face 22 to the bolthole 40, a second plate 52 extending into the interior 46 from the second face 24 to the bolthole 40, and a third plate 54 extending into the interior 46 from the third face 26 to the bolthole 40. The first plate 50 and third plate 54 our shorter than the second plate 52 so the bolthole 40 is held by the buttressing 48 offset from the geometric center 44 of the triangular shaped foot 20.

The pick 32 may have a first portion 56 that is rectangular shaped and directly extends from a top of the third face 26, and a second portion 58 that is serrated and directly extends from the first portion 56. The first rail 12 may have an outer face 60 and an inner face 62. The ladder foot 20 disposed on the outer face 60 of the first rail 12, and including a second ladder foot 64 rotatably attached to the inner face 62 with the bolt 42 that extends through the ladder 10. When there is a second ladder foot adjacent the first ladder foot, typically the first ladder foot and the second ladder foot will have the same face positioned to contact ground.

The present invention pertains to a method for placing a ladder 10. The method comprises the steps of moving the ladder 10 to a desired location. The ladder 10 having a first rail 12 and a second rail 16 and rungs 18 attached to the first rail 12 and second rail 16 upon which a user climbs the ladder 10. There is the step of rotating a ladder foot 20 attached adjacent to a bottom 14 of the first rail 12 until one of three distinct and different surfaces of the ladder foot 20 is facing ground. There is the step of setting the ladder 10 onto the ground with the one of three distinct and different surfaces of the ladder foot 20 resting on the ground when the ladder 10 is upright.

The present invention pertains to a ladder foot 20 rotatably attached adjacent to a bottom 14 of a first rail 12 of a ladder 10. The ladder foot 20 comprises three distinct and different surfaces, with the first rail 12 resting on one of the three surfaces at any one time the first rail 12 is upright. The first rail 12 changing to any of the three surfaces for the first rail 12 to be upright upon by rotating the ladder foot 20. The ladder foot 20 comprises a bolthole 40 through which a bolt 42 extends to rotatably attach the ladder foot 20 to the first rail 12.

The present invention pertains to a method for making a ladder 10. The method comprises the steps of placing a bolt 42 through a bolthole 40 of a ladder foot 20 having three distinct and different surfaces, with a first rail 12 of the ladder 10 resting on one of the three surfaces at any one time the first rail 12 is upright. The first rail 12 changing to any of the three surfaces for the first rail 12 to be upright upon by rotating the ladder foot 20. There is the step of attaching the ladder foot 20 to the first rail 12 with the bolt 42.

This invention is preferably an extension ladder foot 20 which is shaped like a triangle. The foot 20 is oriented on the ladder base rail so that the triangle shape is observed when viewed from the side. One face of the triangular foot 20 engages the ground (or floor) at a time. Each of the three faces of the foot 20 has distinct features for engaging the ground: one face has a fine rubber tread 34, one face has a more coarse rubber tread, and one face has an "ice pick" feature. The foot 20 is able to pivot on the bolt 42 by which it is attached to the base rail in order for the user to bring any face of the foot 20 the user desires into ground contact.

The attachment/pivot bolt 42 does not pass through the geometric center 44 of the triangle shape but rather is closer to the face with the fine rubber tread 34 than the face with the coarse rubber tread. The foot 20 is therefore "taller" when the coarse tread is on the ground. This design feature enables the user to level the ladder 10 to some degree if it is setup on uneven ground by using the coarse tread face on the low face and the fine tread face on the high face.

The ladder foot 20 enables a user to quickly change the foot 20 contact surface to match the supporting surface condition. For instance, the fine tread for indoor use, coarse tread for outdoor use, and the ice pick 32 when it is necessary to dig into the supporting surface. The ladder foot 20 also enables the user to level the ladder 10 a small amount by using fine tread on one face and coarse tread on the other.

The width of each face is between 1 inch and 4 inches. The length of each face is between 3 inches and 8 inches. The thickness of each face is between 1%8 inch and % inch. The foot 20 is made of either aluminum steel or plastic. There is a space between half-inch and 2 inches between the first rail and the foot twenty. The length of the pick is between 1 inch and 4 inches and has the same width as the faces. The ladder when positioned upright on the first foot and the second foot is able to withstand a downward load of at least 600 lbs. without failing, Although the invention has been described in detail in the foregoing embodiments for the purpose of illustration, it is to be understood that such detail is solely for that purpose and that variations can be made therein by those skilled in the art without departing from, the spirit and scope of the invention except as it may be described by, the following claims.

The invention claimed is:

1. A ladder comprising:

a first rail having a bottom;

a second rail;

rungs attached to the first rail and the second rail; and a ladder foot rotatably attached adjacent to the bottom of the first rail at a location offset from a geometric center of the ladder foot, the ladder foot having a triangular shape formed from a first face, a second face joined to the first face, and a third face joined to the first face and the second face, wherein the first face includes a first surface, the second face includes a second surface, and the third face includes an ice pick, the ice pick comprising a generally rectangular shaped first portion that extends generally perpendicular from the third surface and a second portion that extends directly from the first portion, wherein the second portion has a serrated edge, wherein each of the first surface, the second surface, and the ice pick are configured to contact a ground surface at a different rotational position of the ladder foot, wherein the ice pick is configured to at least partially penetrate the ground surface, and wherein the first surface has a first tread and the second surface has a second tread that is more coarse than the first tread, the first surface being directly connected to the second surface at a fixed angle relative to the second surface.

2. The ladder of claim 1 wherein the ladder foot has an interior with buttressing that holds a bolthole through which a bolt extends to attach the ladder foot to the first rail.

3. The ladder of claim 2 wherein the buttressing includes a first plate extending into the interior from the first face to the bolthole, a second plate extending into the interior from the second face to the bolthole, and a third plate extending into the interior from the third face to the bolthole, the first plate and the third plate being shorter than the second plate so that the bolthole is held by the buttressing in a position offset from the geometric center.

4. The ladder of claim 1 wherein the first rail has an outer face and an inner face, the ladder foot disposed on the outer face of the first rail, and including a second ladder foot rotatably attached to the inner face.

5. A ladder comprising:
- a first rail;
- a second rail;
- one or more rungs attached to the first rail and the second rail; and
- a foot rotatably coupled to a first side of the first rail by a fastener, the fastener being fed through an aperture that is held in a position offset from a geometric center of the foot by buttressing,
- wherein the foot includes a first face, a second face, and a third face joined to form a triangular shape, the second face disposed at a fixed angle relative to the first face, the first face including a first surface different from a second surface of the second face, and
- wherein the buttressing includes a first plate extending into an interior of the foot from the first face to the aperture, a second plate extending into the interior of the foot from the second face to the aperture, and a third plate extending into the interior of the foot from the third face to the aperture.

6. The ladder of claim 5 wherein the first surface comprises a first tread and the second surface comprises a second tread that is more coarse than the first tread.

7. The ladder of claim 5 further comprising a pick extending from the third face of the foot.

8. The ladder of claim 7 wherein the pick includes a serrated edge.

9. The ladder of claim 5 wherein the foot is selectively pivotable about the fastener between a first rotational position in which only the first face contacts a ground surface and a second rotational position in which only the second face contacts the ground surface.

10. The ladder of claim 5 wherein the third face is disposed at respective fixed angles relative to the first face and the second face such that the first face, the second face, and the third face together form the triangular shape.

11. The ladder of claim 5 wherein the first surface is directly connected to the second surface.

12. The ladder of claim 5 wherein when the buttressing holds the aperture in the position, a first shortest distance between the aperture and the first face is less than a second shortest distance between the aperture and the second face.

13. The ladder of claim 12 wherein a third shortest distance between the aperture and the third face is generally equal to the second shortest distance.

14. The ladder of claim 5 wherein the first rail has an outer face and an inner face, the foot disposed on the outer face of the first rail, and including a second foot rotatably attached to the inner face.

15. The ladder of claim 5, wherein the first plate and the third plate being shorter than the second plate so that the aperture is held by the buttressing offset from the geometric center.

16. A ladder comprising:
- a first rail and a second rail arranged generally parallel to one another;
- a plurality of rungs attached to the first rail and the second rail;
- a first ladder foot including a first triangle-shaped body, interior strengthening ribs, and a first aperture, the first ladder foot rotatably coupled near a bottom of the first rail via a first fastener disposed through the first aperture, which is positioned offset from a first geometric center of the first ladder foot; and
- a second ladder foot including a second triangle-shaped body, interior strengthening ribs, and a second aperture, the second ladder foot rotatably coupled near a bottom of the second rail via a second fastener disposed through the second aperture, which is positioned offset from a second geometric center of the second ladder foot;
- wherein the first triangle-shaped body and the second triangle-shaped body include a first face defining a first side of the triangle-shaped body, a second face defining a second side of the triangle-shaped body joined to the first face at a fixed angle relative to the first face, and a third face defining a third side of the triangle-shaped body joined to the first face and the second face;
- wherein the first face includes a first tread, the second face includes a second tread that is more coarse than the first tread, and the third face includes an ice pick extending generally outward therefrom, the ice pick being formed of a flat, elongated extension of the third face; and
- the first triangle-shaped body is selectively pivotable about the first fastener between a first rotational position in which only the first face contacts a ground surface, a second rotational position in which only the second face contacts the ground surface, and a third rotational position in which the ice pick contacts the ground surface.

17. The ladder of claim 16 wherein the ice pick is configured to at least partially penetrate the ground surface.

18. The ladder of claim 16 wherein the ice pick extends generally orthogonally from the third face and further comprises a generally rectangular portion with a serrated edge.

* * * * *